June 24, 1930.  J. COYLE ET AL  1,767,965
MACHINE FOR CLOSING FILLED CANS
Filed Nov. 10, 1927   10 Sheets-Sheet 1

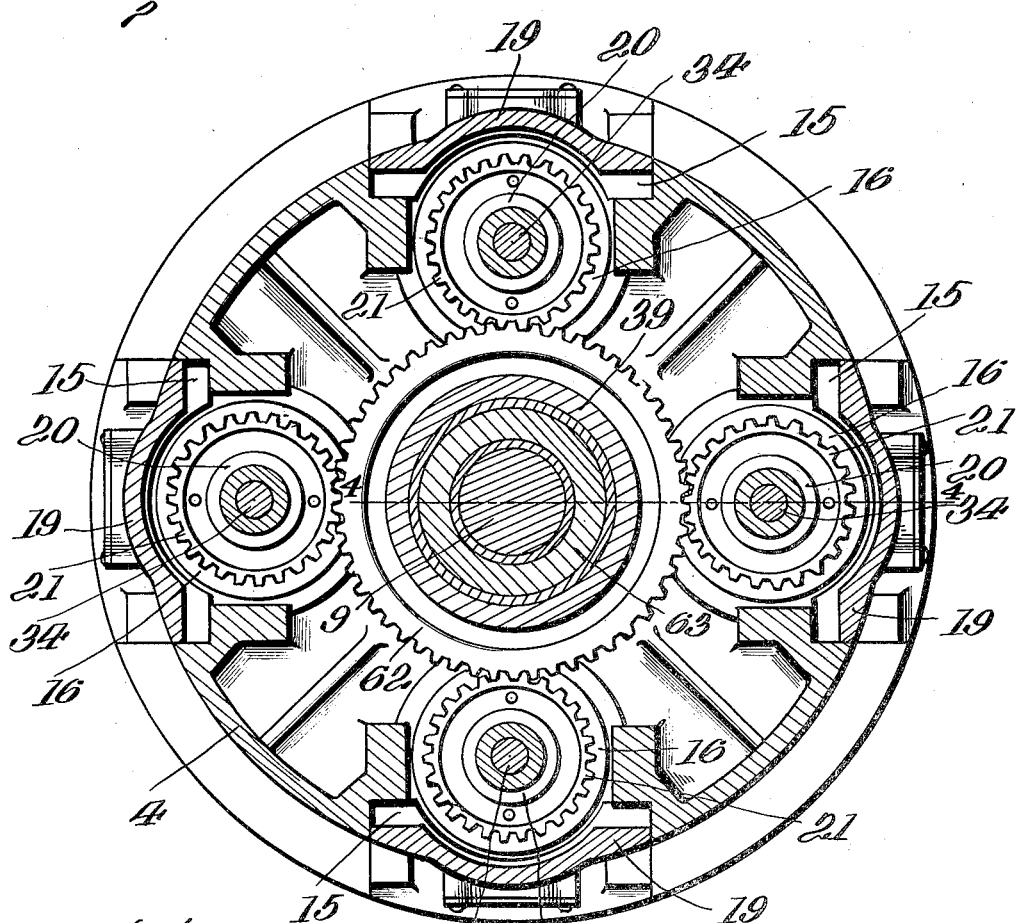
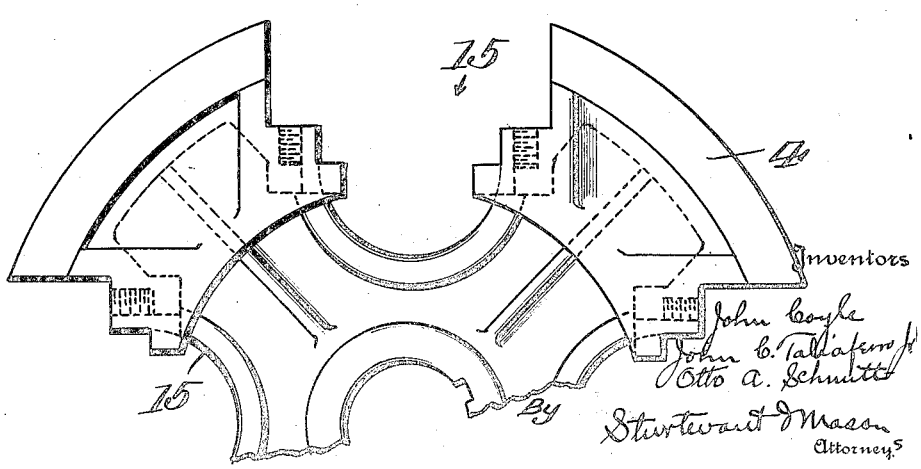

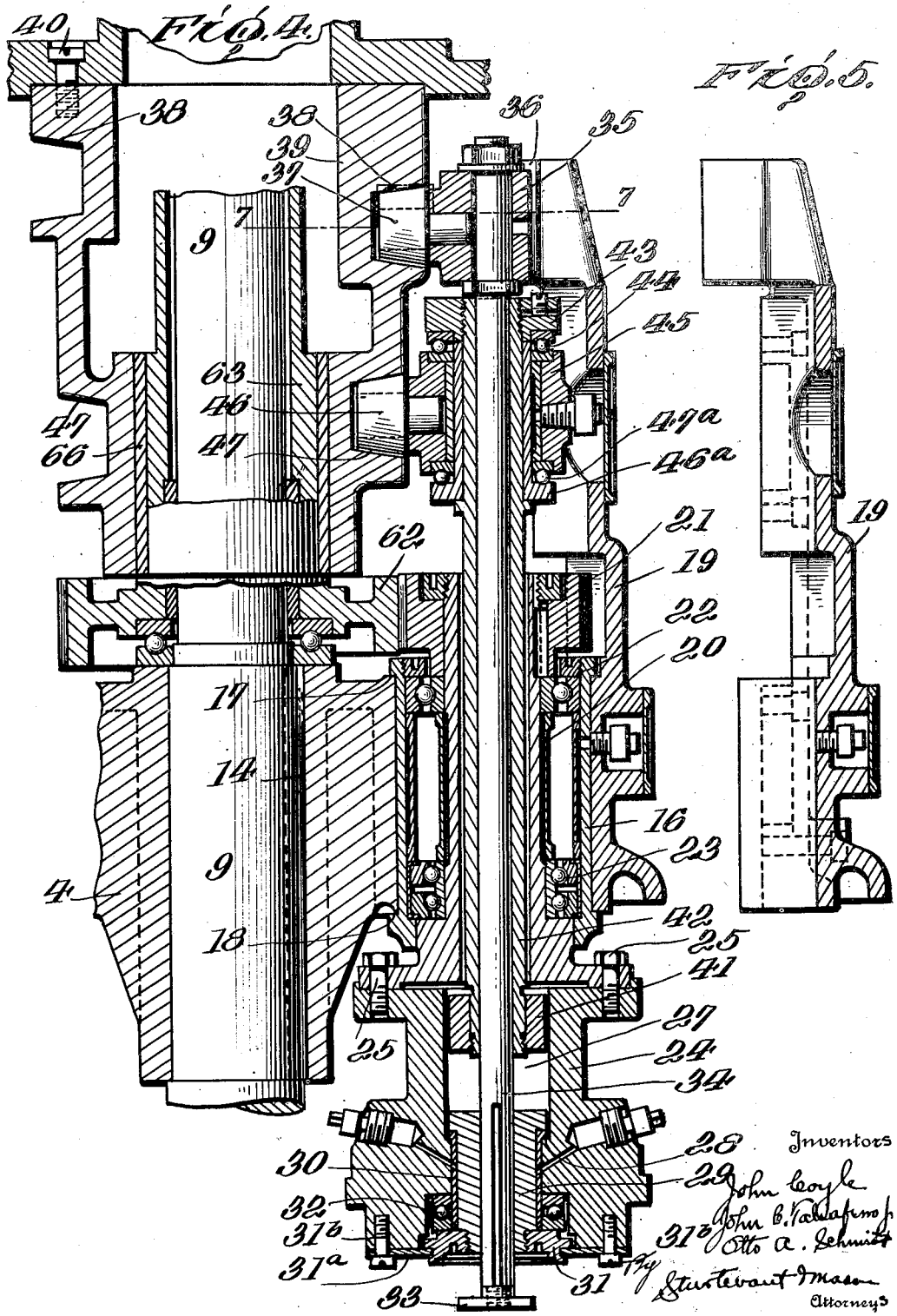

June 24, 1930.   J. COYLE ET AL   1,767,965
MACHINE FOR CLOSING FILLED CANS
Filed Nov. 10, 1927   10 Sheets-Sheet 9

Inventors
John Coyle
John C. Taliaferro Jr.
Otto A. Schmitt
By Sturtevant Mason
Attorneys

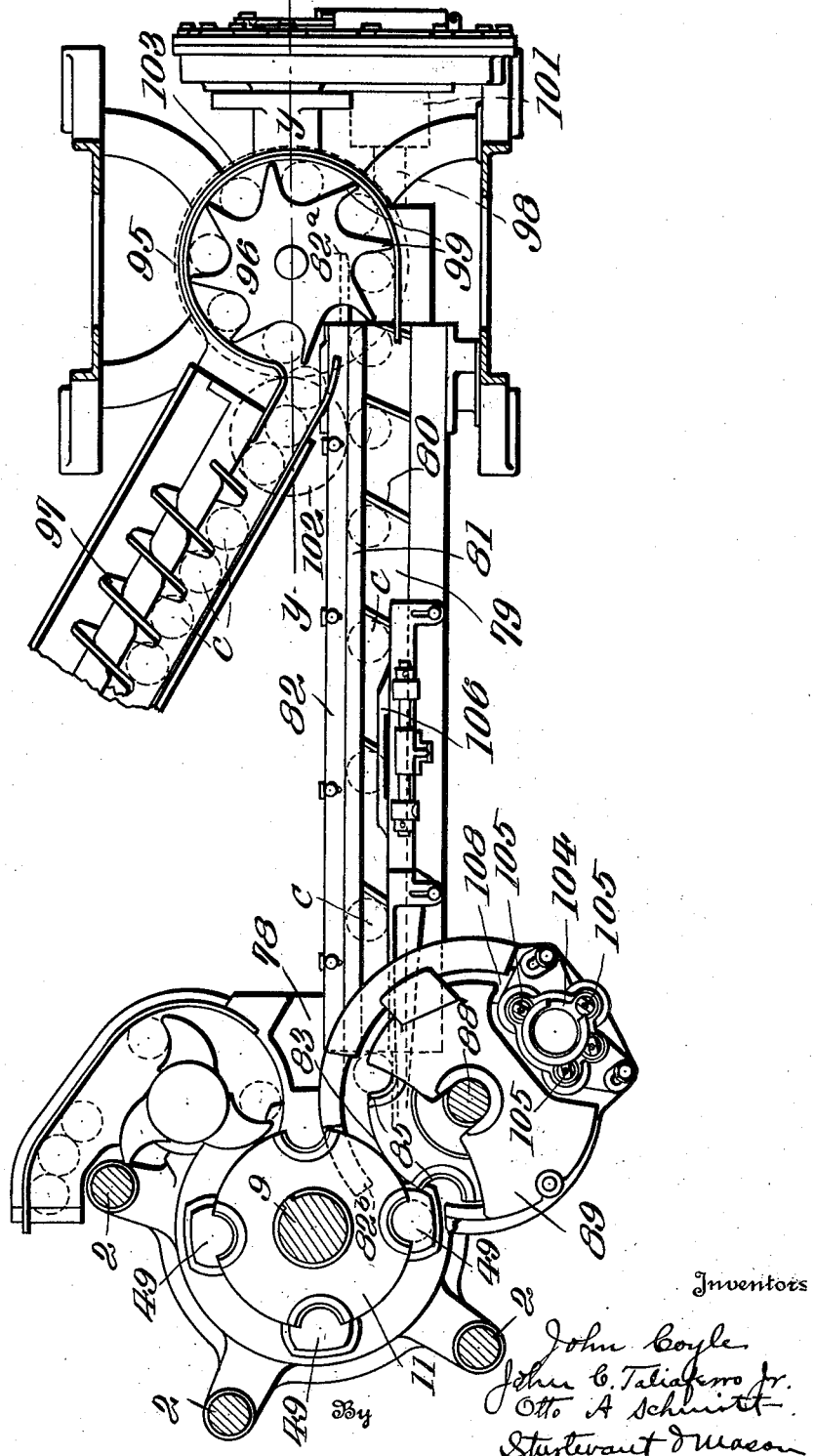

Patented June 24, 1930

1,767,965

UNITED STATES PATENT OFFICE

JOHN COYLE, JOHN C. TALIAFERRO, JR., AND OTTO A. SCHMITT, OF BALTIMORE, MARYLAND, ASSIGNORS TO CONTINENTAL CAN COMPANY, INC., OF NEW YORK, N. Y., A CORPORATION OF NEW YORK

MACHINE FOR CLOSING FILLED CANS

Application filed November 10, 1927. Serial No. 232,313.

The invention relates to new and useful improvements in machines for closing filled cans, and more particularly to a machine having a plurality of continuously traveling seaming units.

An object of the invention is to provide a closing machine of the above type wherein each seaming unit includes a rotatable head carrying seaming rolls, and wherein said heads are so timed in their rotation that the paths of travel of the seaming rolls about the centers of the heads intersect, thus enabling the path of bodily travel of the heads to be relatively close to the center of the machine.

A further object of the invention is to provide a machine of the above type wherein the traveling seaming units are disposed on turrets supported to rotate on the base of the machine and guided in their rotation by an upper frame which is supported by columns carried by the base and located outside of the path of rotation of the seaming units.

A still further object of the invention is to provide a machine of the above type wherein a housing is mounted on the upper frame, and the actuating devices both for the turrets and the seaming units are all disposed within said housing and enclosed therein by a removable cover plate which gives ready access to the actuating devices.

A still further object of the invention is to provide a seaming unit for a closing machine wherein the seaming rolls are carried by seaming levers disposed at opposite sides of the seaming head, and wherein the cam for actuating the seaming levers is mounted so as to freely move laterally, limited in its movements by the contact of the seaming rolls with the seam.

A still further object of the invention is to provide a closing machine of the above type wherein each seaming unit is provided with a center pad and a chuck, and the center pad is so operated during the bodily travel of the seaming unit as to seat the can end in the can body substantially at the point of time when the can body commences its curved path of travel, said seating pad operating with a yielding tension so as to permit the centering of the can body and can end beneath the chuck after the end has been engaged by said seating pad.

A still further object of the invention is to provide a machine of the above type wherein the filled cans are delivered to the machine by a rotating spirally threaded feed drum which has its longitudinal axis disposed in a line passing between the center of bodily travel of the seaming units and the center of the seaming station at the time when the can end and can body are chucked, so that the filled can is delivered on to the can support with comparatively little curved movement before the can is chucked.

A still further object of the invention is to provide a machine of the above type with a spirally threaded feed drum and cooperating support and guide rail, which guide rail extends along said drum and into the closing machine so as to guide the filled can until it is centered on the can support, and wherein the turret having half molds is associated with the feed drum and with the seaming units of the closing machine so as to convey the filled can from the drum to the can support.

A still further object of the invention is to provide a closing machine of the above type having a spirally threaded feed drum for delivering the filled cans to the closing machine wherein the spiral thread throughout substantially the entire length of the feed drum is constructed so as to impart a uniform, constantly increasing acceleration to the filled cans so that the liquid content of the filled cans is accelerated and synchronized with the acceleration of the cans containing the same.

These and other objects will in part be obvious and will in part be hereinafter more fully disclosed.

In the drawings—

Fig. 2 is a sectional view on the line 2—2 of Fig. 1;

Fig. 3 is a plan view of a portion of the upper turret;

Fig. 4 is a section on the line 4—4 of Fig. 2;

Fig. 5 is a detail partly in section showing the cap for holding the seaming unit in place;

Fig. 14 is a plan view showing more or less diagrammatically the arrangement of the closing machine to the filling machine and the means for operating the feed drum.

General statement

Figure 1:
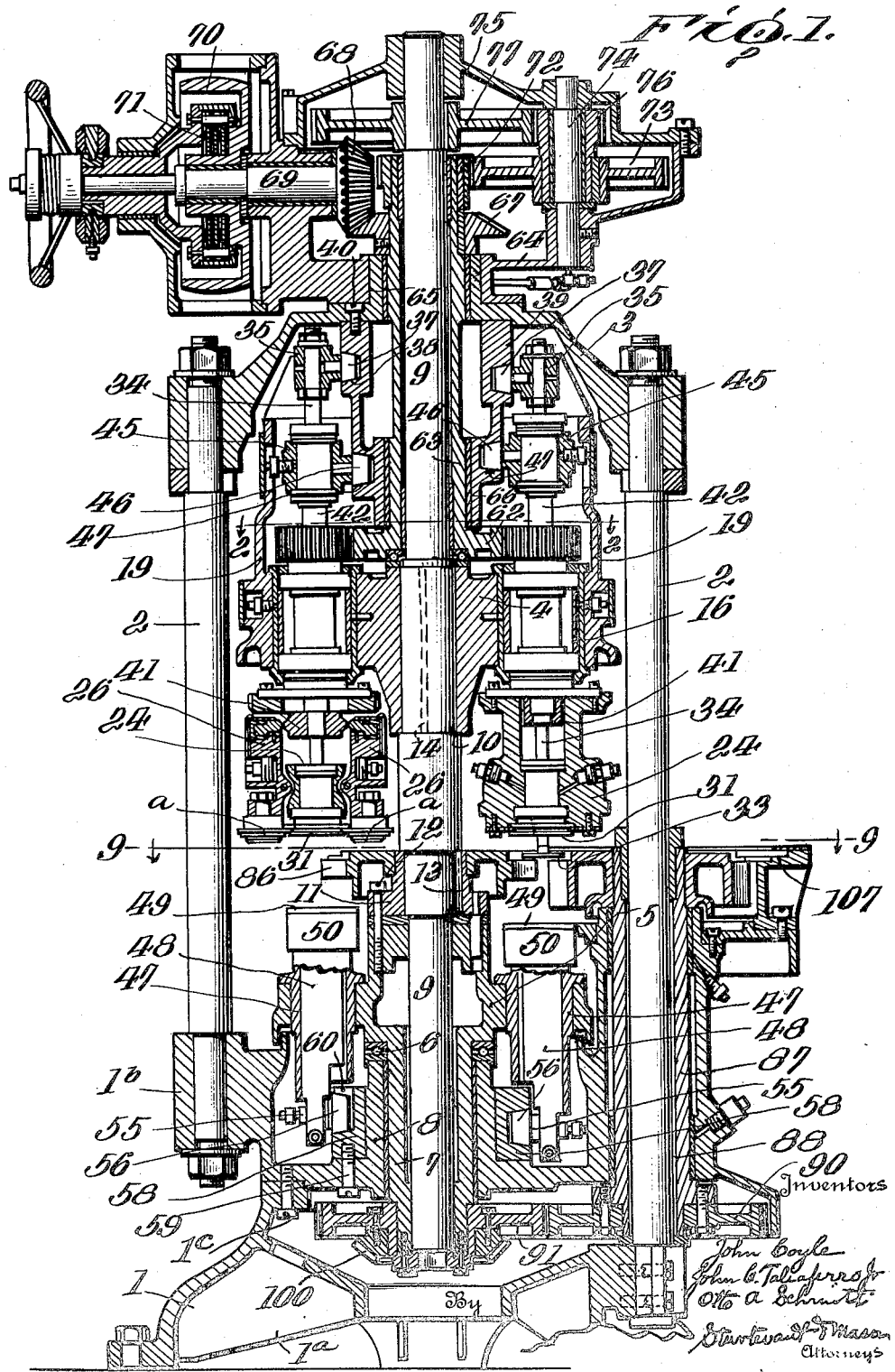
Figure 1 is a vertical sectional view axially through the rotating turrets of the closing machine.
Figure 6:
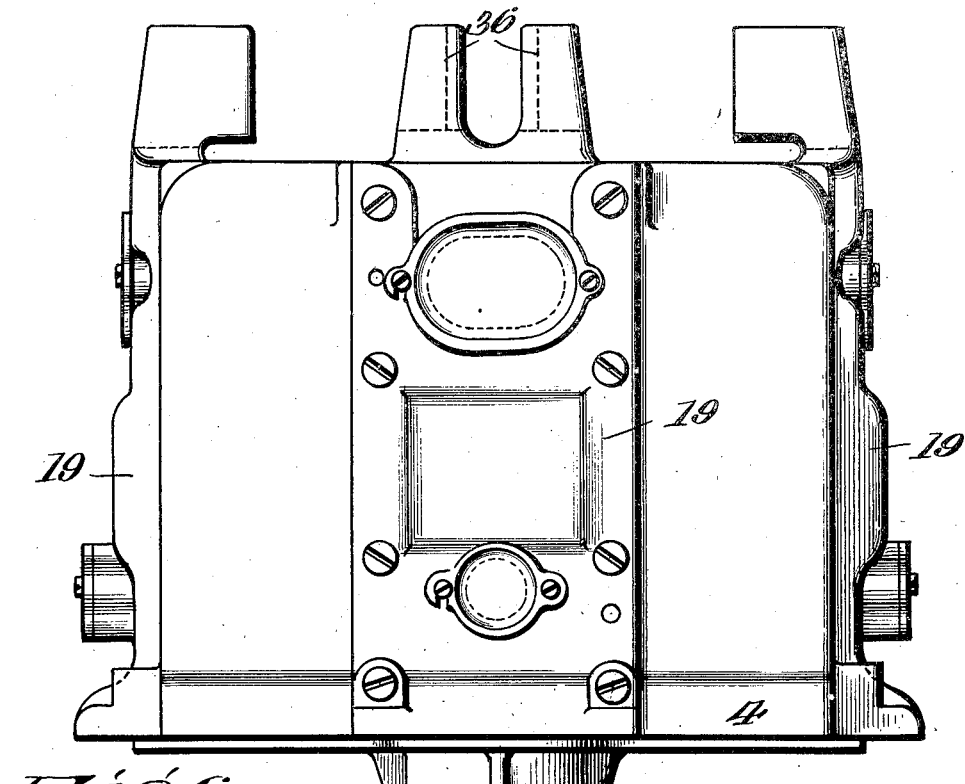
Fig. 6 is a side view of the upper turret with the cap plates in place thereon.
Figure 7:
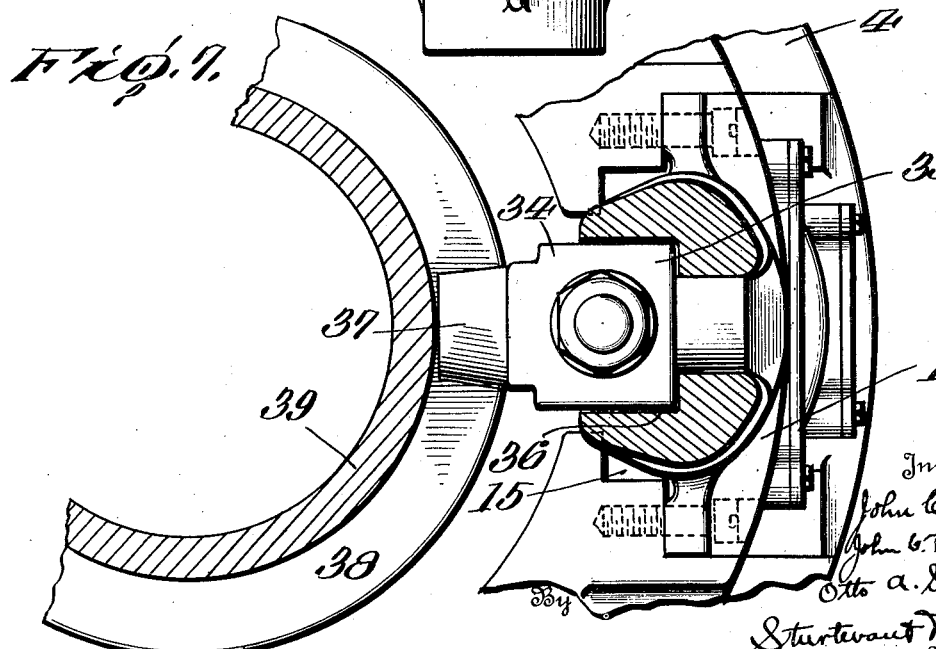
Fig. 7 is a sectional view on the line 7—7 of Fig. 4.
Figure 8:
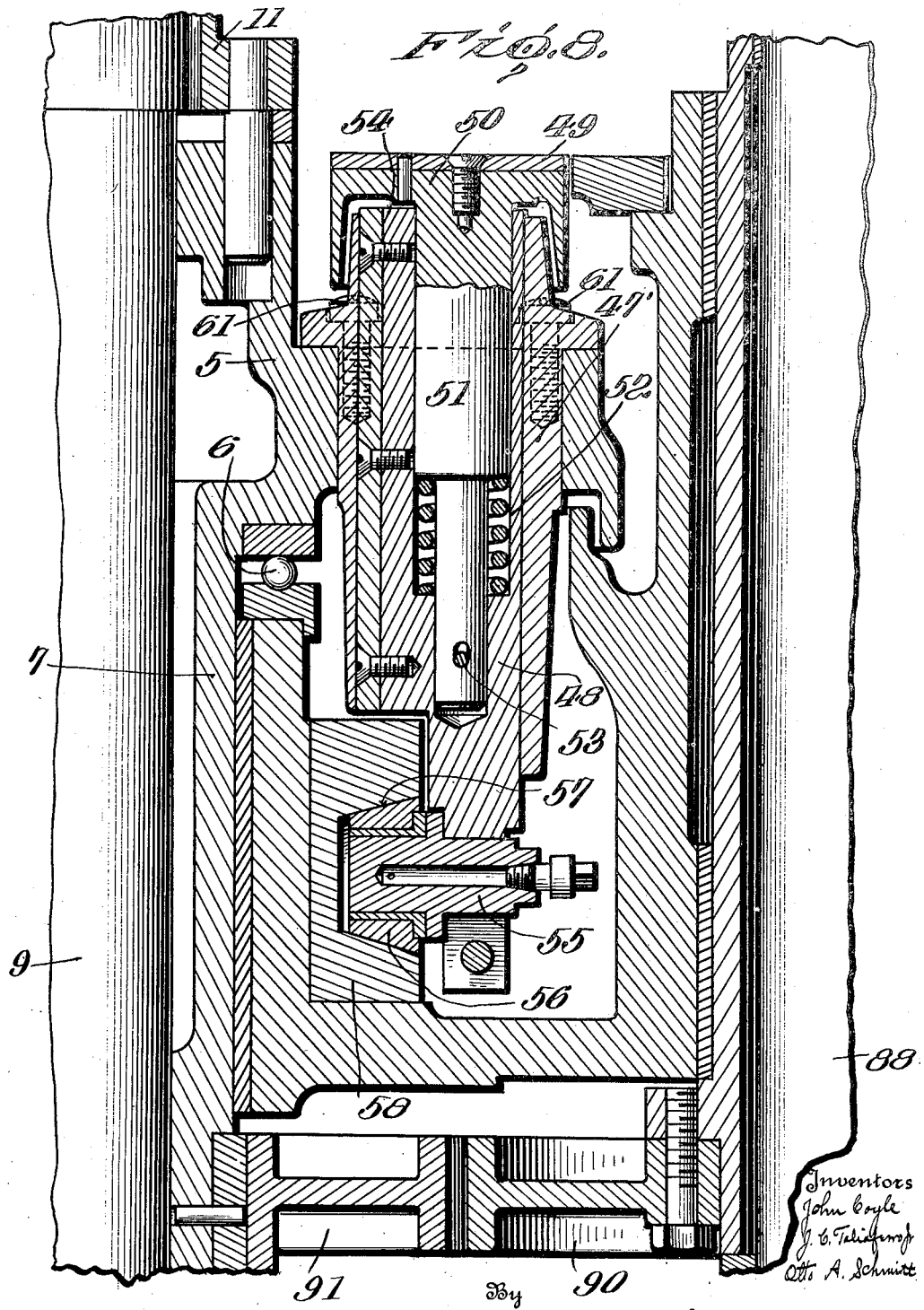
Fig. 8 is a vertical sectional view through one of the can supports and the parts of the machine immediately adjacent thereto.

The invention is directed to a machine for closing filled cans by double seaming a can end on to the can body portion. It includes a supporting base on which are mounted an upper and a lower rotating turret. The upper turret is mounted on a central spindle supported by the lower turret. The base carries columns outside of the turrets which support an upper frame for supporting and guiding the spindle in its rotation. Mounted on the upper turret are a series of seaming units. Each seaming unit includes a supporting sleeve bushing. In this bushing, and mounted in suitable ball bearings is a sleeve which is adapted to be rotated, and this sleeve carries the seaming head at its lower end which is removably connected thereto. Mounted on the seaming head are seaming levers carrying the seaming rolls, and these rolls are moved into engagement with the can end for forming the double seam by means of a cam which is mounted on a hollow spindle located within the sleeve. Said spindle has a very loose fit within the sleeve and so that it floats therein. This permits the cam for operating the seaming rolls to move laterally, limited only by the contact of the seaming rolls with the seam. The hollow spindle carrying the cam is mounted on ball bearings so that it is free to rotate, and is moved up and down for actuating the seaming levers by a roller which engages a stationary cam. The seaming units travel bodily, and thus it is that the cam is moved up and down at the proper time for actuating the seaming levers. Within the hollow spindle is a rod carrying a seating pad, and this rod is moved up and down by a roll engaging a stationary cam. At the lower part of the head is a chuck carried by a sleeve which is mounted in the head so that the head may rotate freely around the sleeve. The sleeve is keyed to the rod carrying the seating pad, and the rod is held from rotation, and this holds the chuck from rotation. Beneath the seaming unit is a supporting unit for the can which consists of a supporting sleeve bushing in which the parts are mounted so that the supporting unit can be assembled and placed in the machine, or removed and replaced at any time. This supporting unit includes a knurled plate on which the filled can is placed, a plunger on which the knurled plate is mounted, so that it can yield, and a roller carried by the plunger which engages a stationary cam for moving the plunger up and down. The filled can is placed on the support and then is raised into engagement with the chuck and is held between the chuck and the support nonrotatably while the head rotates and carries the seaming rolls around the can for forming the double seam. The sleeves carrying the seaming heads are each provided with a gear, and these gears mesh with a common gear on the central sleeve surrounding the central spindle connected to the turrets. The central spindle is rotated at one speed, and the sleeve at another speed, by a driving mechanism all mounted on a housing carried by the upper frame of the machine. The filled cans are fed into the machine by a drum feed which includes a stationary support along which the cans are slid by a spiral thread on the drum. A guide rail extends along the drum and projects into the closing machine between the path of movement of the chuck and the can support, and this single guide rail guides the filled can all the way into the machine until it is properly centered on the support and beneath the chuck. The closing machine is provided with a series of half molds, one for each seaming unit, and these half molds center the can body beneath the chuck. The rotating turret at the side of the machine is also provided with half molds, which deliver the filled cans from the drum into the closing machine, and the drum is so positioned as to feed the filled cans into these half molds of the outside turret so that the can is taken by the rotating turret without any interruption whatever to its forward movement. The half mold on the outside turret cooperates with the half mold in the closing machine in rounding up the can body. The outside turret is also provided with a can end seat, and places the can end in the machine directly over the can end body. The drum for feeding the filled cans to the closing machine has a thread which is of uniform accelerated pitch from one end thereof to the other.

The invention will probably be better understood by a detail reference to the drawings which show one embodiment thereof. The structure of the closing machine will be first described, and then the means for feeding the filled cans and ends into the closing machine.

Frame and turret structure

The improved machine includes a supporting base 1 which may be of the usual type. This supporting base carries a series of columns 2, 2 which are secured to the base in any suitable way, and support at their upper ends the upper frame 3 of the machine. Mounted to rotate within the columns 2 is an upper turret 4, and a lower turret 5. The lower turret 5 is supported on ball bearings 6 carried by the base of the machine. Said turret is provided with a sleeve 7 which projects below the ball bearing support 6, and this sleeve rotates in a bearing 8. Mounted on the turret is a spindle or center column 9. This spindle or center column 9 is provided with a shouldered portion 10, and the upper turret 4 which surrounds the spindle or column 9 rests on this shoulder 10. At the upper end of the sleeve 7 of the lower turret there is a rounding up turret 11 which is secured by bolts 12 to the turret. The lower turret is keyed at 13 to the spindle or column 9. The upper turret 4 is keyed at 14 to the spindle or column 9, so that when the spindle or column 9 is rotated, it will rotate both of the turrets.

Seaming mechanism

Mounted on the upper turret is a series of independent seaming mechanisms. The machine as shown contains four complete seaming mechanisms which will be referred to as units. These units are all alike, and a description of one will answer for the others. The upper turret 4 is provided with vertical cut-away portions 15. There are four of these cut-away portions, and there is a seaming unit mounted in each cut-away portion. The seaming unit consists of a supporting sleeve bushing 16 provided with shoulders 17 and 18 which fit over the turret at the upper and lower ends of the cut-away portions 15. This bushing sleeve supports the entire seaming unit, and the sleeve is held in place by a cover plate 19 which is bolted to the turret. The seaming unit includes a sleeve spindle 20 which carries a gear 21 at its upper end. This sleeve spindle fits within the sleeve bushing 16, and is mounted in the ball bearings 22, 23 carried by the sleeve bushing. The sleeve spindle carries a seaming head 24 at its lower end, said seaming head being removably secured to the spindle by suitable bolts 25, 25. The seaming head carries two pairs of seaming levers. One pair 26, 26 is shown in Fig. 1 of the drawings. The other pair is arranged intermediate these levers 26, 26. One pair of levers carry the first operation seaming rolls, and the other pair of levers carry the second operation seaming rolls. These levers are pivoted to the seaming head so as to swing in vertical planes, and bring the seaming rolls into contact with the can end for double seaming the same on to the can body. The seaming head, so far as the seaming levers and seaming rolls are concerned, is of the usual construction. The sleeve spindle 20 is rotated, and this causes the head with the seaming rolls mounted thereon to rotate, and the seaming rolls traveling about the can end will form a double seam in the usual manner.

The seaming head 24 has a central recess 27 therein. The head within the recess is formed with a shoulder 28. Located in the recess is a chuck supporting sleeve 29. This chuck supporting sleeve has a projecting ledge at its upper end which overlies the shoulder 28. A suitable bushing 30 is placed between the chuck sleeve and the seaming head so that the seaming head may rotate about the chuck sleeve. A chuck 31 is secured to this chuck sleeve, and ball bearings 32 are provided between the chuck and the seaming head. A guard plate 31$^a$ is secured to the head by bolts 31$^b$. This plate prevents the chuck from entering the can when no end is fed into the machine.

A cover seating pad 33 is associated with the chuck. This pad is carried by a spindle 34, and the chuck sleeve is keyed to the spindle. The spindle is held from rotation, and this will hold the chuck from rotating. The seating pad 33 is comparatively small in diameter relative to the diameter of the chuck, and the recess in the can end which receives the chuck, the purpose of which will be described later. The spindle 34 carries a head 35 at its upper end which is rectangular in cross section. This rectangular head engages a rectangular recess 36 in the upper end of the cover plate 19. The head is rigidly secured to the spindle 34, and as the head cannot rotate, it holds the spindle from rotating, and this in turn holds the chuck from rotating. The spindle, however, is moved endwise in the chuck sleeve, so that the seating pad is moved relative to the chuck. The chuck has no vertical movement in the present machine. The spindle is moved endwise by means of a roller 37 which runs in a groove 38 formed in a sleeve 39 secured to the upper frame 3 by bolts 40. This sleeve does not rotate, and therefore, when the turrets rotate about the sleeve, the roller 37 will run along the cam groove 38 and will reciprocate the spindle carrying the seating pad.

The seaming levers are moved into engagement with the seam by means of a cam 41. This cam 41 is located in the central recess 27 and is supported by a hollow spindle 42. This hollow spindle 42 surrounds the seating pad spindle 34 and extends through the sleeve spindle 20 which supports the seaming head. The external diameter of this hollow spindle 42 is less than the internal diameter of the sleeve spindle 20, so that this hollow spindle 42 floats in the sleeve spindle supporting the seaming head. The hollow spindle has a head 43 secured to its upper end. This hollow head bears on a ball bearing 44 which in turn bears on a bracket 45. The bracket 45 carries a roller 46 which runs in a cam groove 47 in the stationary sleeve 39. The bracket 45 does not rotate, but the hollow spindle is free to rotate on the ball bearing 44. There is a shouldered sleeve 46ª mounted on the spindle and held from end movement thereon, and ball bearings 47ª are placed between the bracket 45 and this shouldered sleeve. Thus it is that the hollow spindle 42 is supported by the bracket 45 so that it may rotate freely therein, and yet the spindle is moved up and down with the up and down movement of the bracket 45. As this spindle is moved up and down, it will move the cam 41 up and down, and this will actuate the seaming levers. The recess in the head and the cam are so shaped that the cam is caused to rotate with the head. This enables the cam to be properly shaped so that by a movement of the same longitudinally of the head, the seaming levers are operated in proper sequence.

When the cam is moved to oscillate the seaming levers, it will move the seaming levers into contact with the seam. If the can body and can end are slightly out of center for any reason relative to the axis of rotation of the seaming head, first one seaming roll will make contact therewith and then the seaming lever becomes an abutment, so to speak, for shifting the cam so as to bring the other seaming roll into contact with the seam. In other words, this floating cam insures that there will be an equal pressure of the seaming rolls against the metal during the formation of the double seam. This insures a very uniform seam without any slipping or dead heading of the seaming rolls.

Can supporting mechanism

Beneath each seaming unit and carried by the lower turret is a can supporting mechanism which will be referred to as supporting units. These supporting units for all of the seaming heads are similar in construction, and a description of one will answer for all. The supporting unit includes a supporting sleeve bushing 47' in which is mounted a reciprocating plunger 48. This plunger carries a knurled plate 49 on which the filled can is supported during seaming. The knurled plate 49 is mounted on a head 50 carried by a stem 51 extending down into the cylindrical recess in the plunger 48. A spring 52 surrounds the lower end of this stem and bears against the shoulder therein. This spring rests against the shoulder in the recess in the plunger. The stem extends below the spring into the plunger and a pin 53 is carried by the plunger and extends through an elongated opening in the stem, so as to permit of a limited movement of the stem in the plunger. The purpose of this construction is to allow the knurled plate carried by the stem 51 to have a limited yielding movement relative to the plunger on which it is supported. After it is moved a limited distance, the lower face of the head 50 will engage the upper end 54 of the plunger.

Mounted at the lower end of the plunger 48 is a bracket arm 55 which carries a roller 56 which runs in a cam groove 57 in a stationary member 58. This stationary member 58 is bolted to the base of the machine by suitable bolts 59. It will be noted that the base 1 in the drawings is shown as made in sections 1ª and 1ᵇ. The section 1ᵇ carries the columns 2, and carries this stationary member having the cam groove. This section 1ᵇ is secured to the section 1ª by suitable bolts 1ᶜ. The member having the cam groove 57 at one place in its circumference is provided with a cutout 60 which is sufficiently large to allow the roller 56 to pass therethrough. This cutout is on the upper side of the member and when the machine is stopped at the proper point in its rotation, the roller may be lifted from the cam groove through this cutout 60. The sleeve bushing 47' which carries the plunger and knurled plate supported thereby, is mounted in a cylindrical recess in the lower turret 5, and is secured therein by bolts 61. When the machine is stopped at the proper point in its rotation so as to bring the roller 56 beneath the cutout 60, the bolts 61 may be removed and then the can support as a unit lifted from the turret by an upward movement thereof. The seaming head must, of course, first be removed.

Actuating mechanism for turrets and seaming units

The seaming heads are rotated by means of a gear 62, which gear meshes with the gears 21 carried by the sleeve spindles 20. This gear 62 is keyed to a sleeve 63 which surrounds the spindle 9. The sleeve 63 extends through the upper frame 3. Mounted at the upper side of the upper frame 3 is a housing 64. The upper frame 3 is provided with bearings 65 and 66, and the sleeve 63 turns freely in said bearings. The column or spindle 9 turns freely in the sleeve 63, and these bearings 65 and 66 serve as a support and guide for the spindle which joins the turrets and helps to hold the turrets properly centered on their supporting ball bearing at the base. The sleeve 63 extends into the housing 64 and is provided with a bevel gear 67. This bevel gear meshes with a bevel gear 68 carried by a shaft 69 which is journaled in the housing 64. The shaft 69 is horizontal and is connected to the driving pulley 70 by means of friction clutch plates 71. These friction clutch plates may be separated, and thus the actuated parts disconnected from the driving pulley 70.

A gear 72 is keyed to the upper end of the sleeve 63 and rotates therewith. This gear 72 meshes with a gear 73 on a stub shaft 74 which is mounted in suitable bearings in the housing and cover plate 75 therefor. A gear 76 mounted on the shaft 74 meshes with a gear 77 which is keyed to the center column of spindle 9. From the above it will be apparent that when the actuated parts are connected to the driving pulley, the horizontal shaft 69, through the gear 68 rotates the sleeve 63, and this causes the gear 62 to rotate, and in turn rotates the seaming heads. As the sleeve 63 rotates, the gears 72, 73, 76 and 77 will cause the spindle or center column 9 to rotate, and this imparts rotation to the turrets. The rotation of the turrets, of course, is very much slower than the rotation of the seaming heads.

The travel of the seaming units with the upper turret will cause the center rod carrying the seating pad to move up and down as the roller passes along the stationary cam associated therewith. This bodily travel of the seaming unit will also cause the floating hollow spindle supporting the cams for actuating the seaming levers to move up and down, and thus bring about the formation of the double seam.

Figure 11:
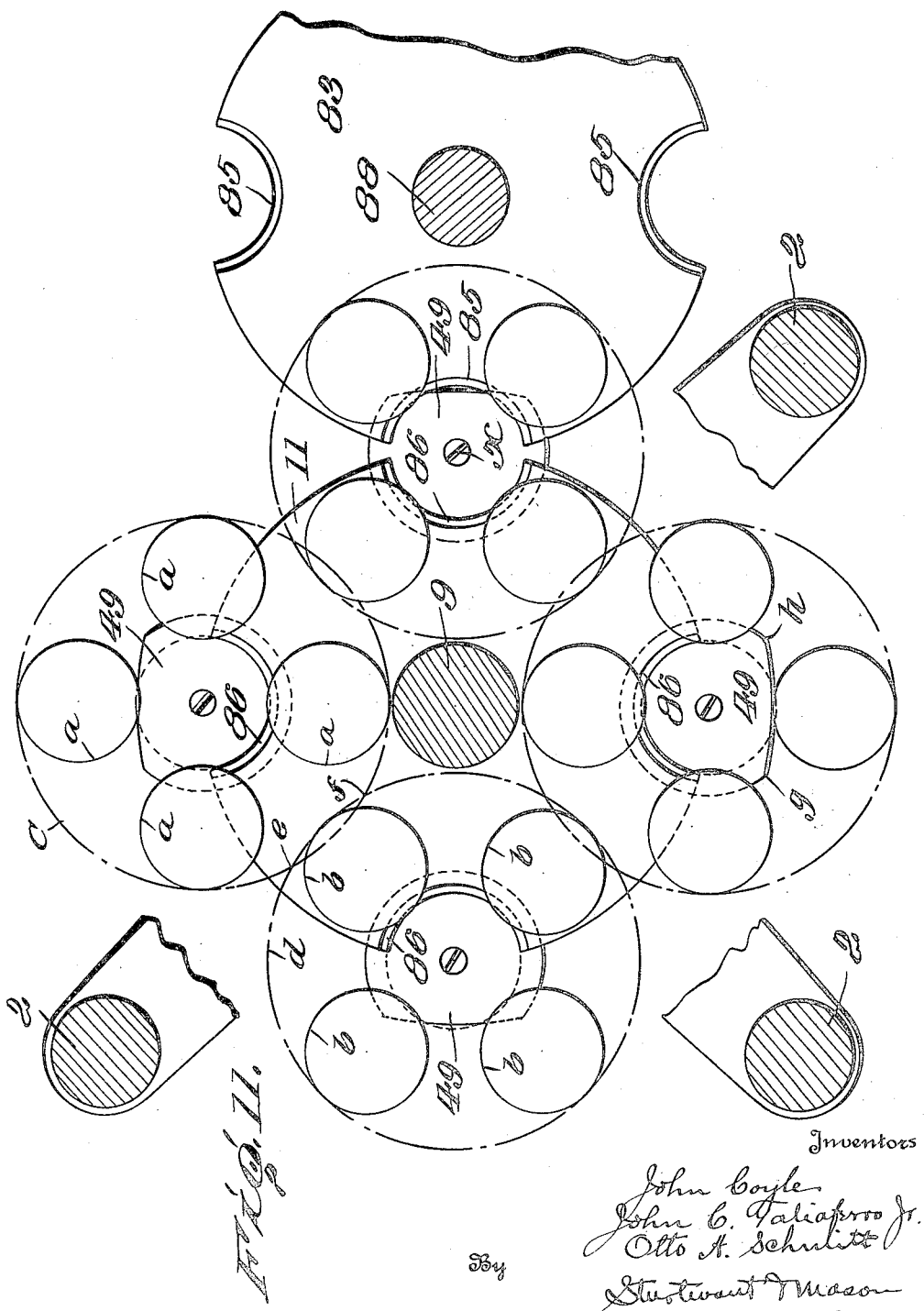
Fig. 11 is an enlarged view showing a section of the machine on the line 9—9 of Fig. 1, and showing the path of movement of the seaming rolls, together with the staggered arrangement of the seaming rolls in adjacent seaming units.

The timing of the gears which rotate the respective seaming units is such that the seaming rolls in adjacent heads are staggered relative to each other. In Fig. 11 of the drawings, the seaming rolls are indicated in full lines at $a$ in one seaming unit, at $b$ in another seaming unit adjacent thereto. The extreme outer path of travel of the seaming rolls $a$ is indicated at $c$, and the extreme outer path of travel of the seaming rolls $b$ is indicated at $d$. It will be noted that these two paths intersect between $e$ and $f$. It will also be noted that the paths of travel $c$ and $d$ are very close to the outer wall of the center spindle or column 9. This positioning of the seaming units close to the center of the machine enables the seaming units to be placed relatively close together and the space between the cans during the seaming operation reduced to a minimum. Whether the can is received at random by the feeding means or semi-timed from the filler, it must be accelerated in order to obtain sufficient space between the cans for the operation of the seaming rolls. It is obvious that if the amount of acceleration or increasing spacing of the cans, which is necessary, is reduced to a minimum, there is less liability of spilling.

*Mechanism for feeding filled cans and ends to closing machine*

Figure 9:
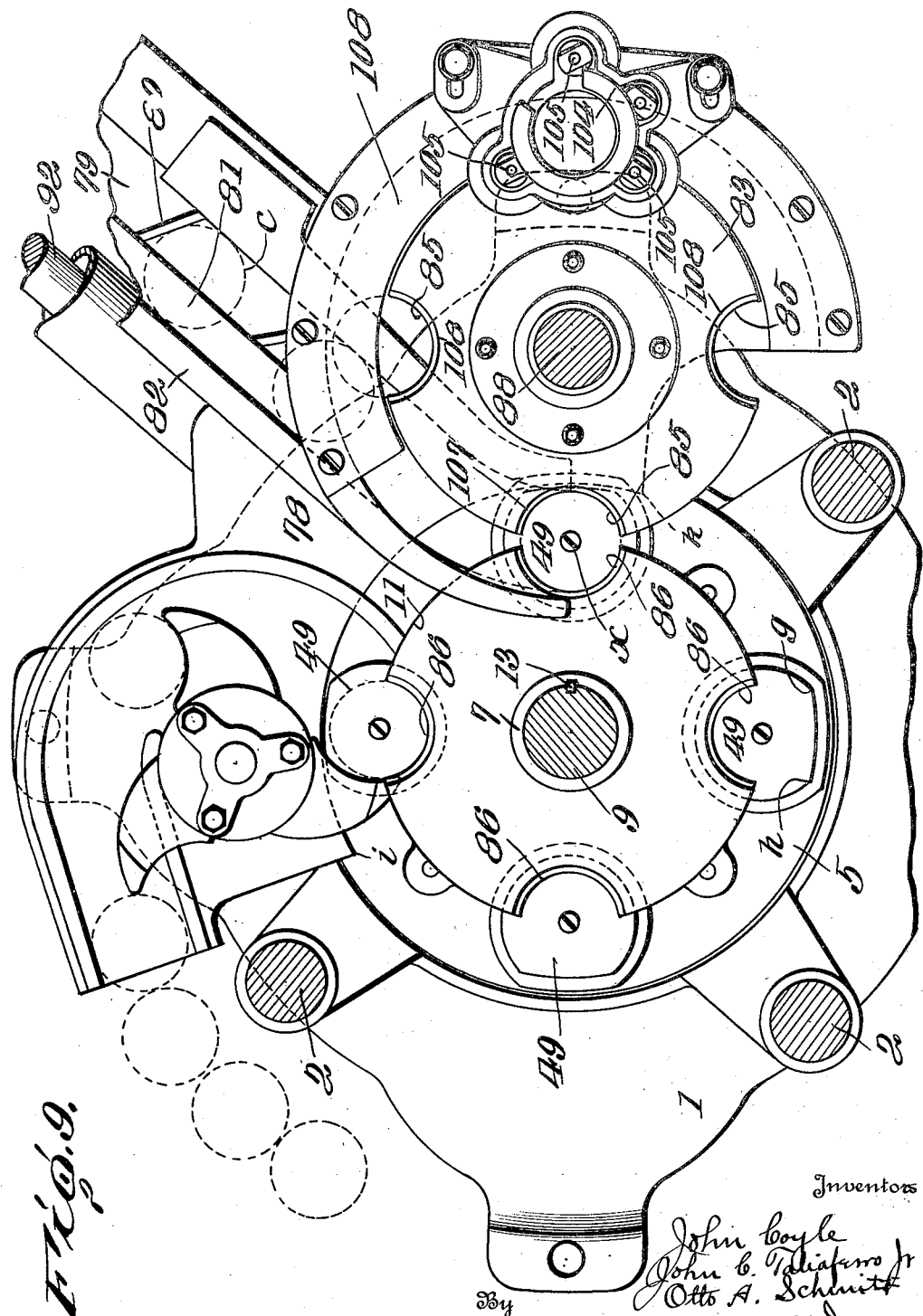
Fig. 9 is a sectional view on the line 9—9 of Fig. 1, showing a part of the feed drum and the operating shaft therefor.
Figure 10:
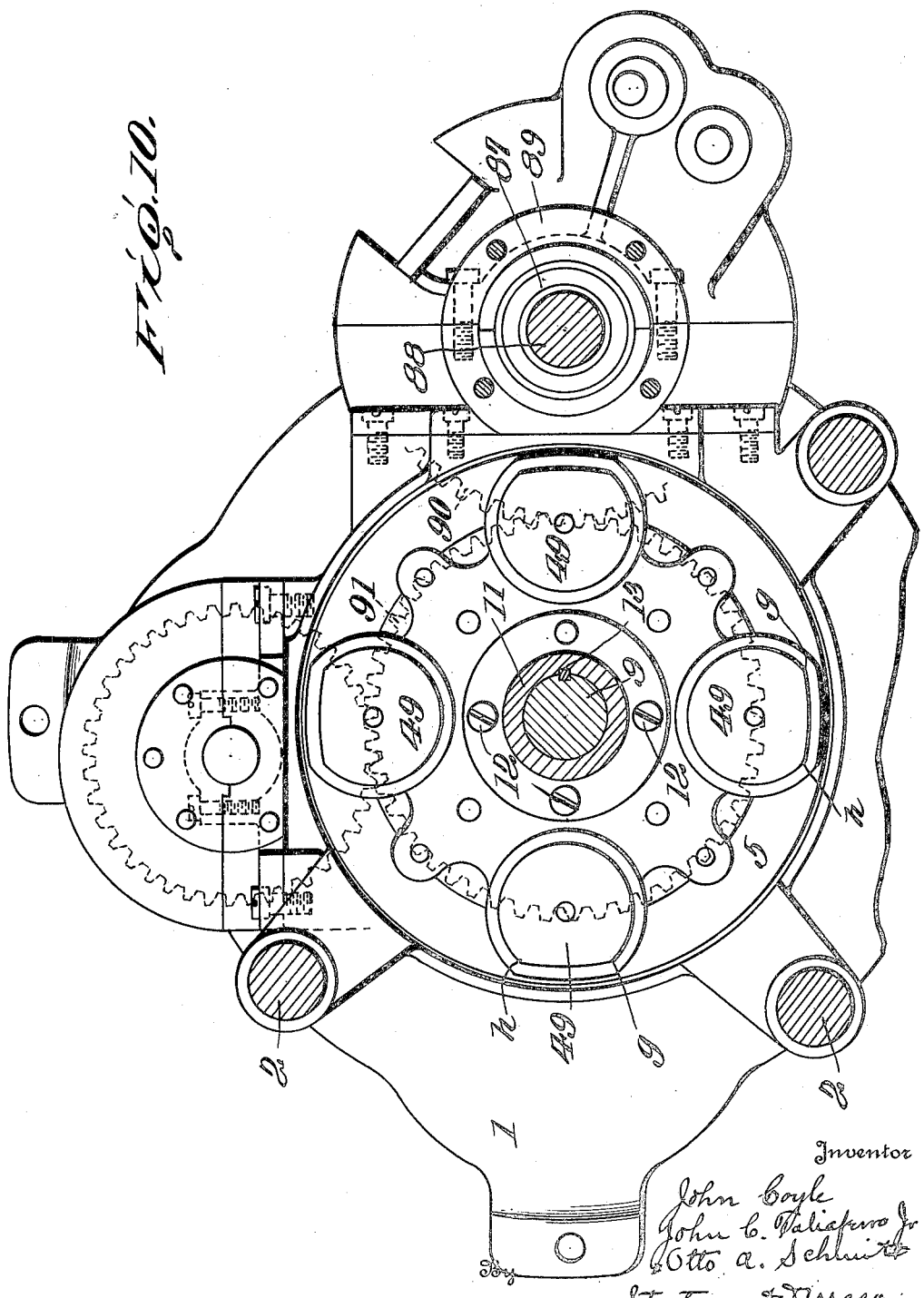
Fig. 10 is a horizontal sectional view through the machine immediately above the can support.

There are two active elements in the feeding of the filled cans to the closing machine. One of these elements includes a feed drum having a spiral thread for moving the filled can along a support and a guiding rail associated therewith. The other active element is the outside rotating turret having a half mold into which the filled can is moved by the thread on the drum. This is accomplished without in any way retarding the forward movement of the filled can. The can is placed in the half mold of the outside turret while the thread is still moving the can, and this outside turret continues the movement of the can across the stationary support and on to the traveling support of the closing machine. The knurled plates or can supports 49 are formed concentric to the center of the plunger which raises and lowers the same, except at the outer side thereof. Each knurled plate from the point $g$ to the point $h$ is curved concentric to the axis of rotation of the closing machine. Adjacent the path of travel of the knurled plates is a stationary support 78. This stationary support is curved from the point $i$ to the point $k$ about the axis of the closing machine as a center, and the curved portion $g$, $h$ of each knurled plate passes close to this curved face $i$, $k$ of the stationary plate as clearly shown in Fig. 9 of the drawings. The stationary plate is cut away to receive the feed drum 79. This cut-away portion extends well into the support 78 so that the end of the drum is very close to the path of travel of the knurled plates, only a sufficient space being necessary to provide a suitable bearing or journal support for the drum. The axis of the feed drum lies in a line which passes just inside of the point X, and this is the point where the filled can is centered on the knurled plate, rounded up by the half molds, ready for the chucking of the can by the chuck of the seaming unit. The feed drum is provided with a spiral thread 80. Alongside of the drum is a support 81 and a guide rail 82. The filled cans are indicated at C in Figures 9 and 14 of the drawings. The filled can rests in part on the support 81 and in part on the drum, and a spiral thread engaging the can moves the same along the support 81. The spiral thread will, of course, crowd the can against the rail 82 and will slide the can along this rail. This rail extends to a point well into the closing machine and terminates at a radial line passing through the center of the machine and the point X. Up to this point it is a single continuous rail, and the filled can is guided thereby directly on to the knurled plate. There are no other supports for the can in the closing machine than the knurled plates.

The outside turret consists of a body portion 83 having four half molds 85, which are adapted to cooperate in succession with the half mold 86 in the rounding up turret 11. This body portion 83 of the outside turret is fixed to a sleeve 87 mounted to rotate about a column 88. This column 88 is mounted in the base and upper frame of the closing machine. There is a cover plate 89 for the sleeve 87. At the lower end of the sleeve there is a gear 90 which meshes with a gear 91 mounted at the lower end of the lower rotating turret (see Fig. 1). As the turret rotates, it will impart rotation to the sleeve 87, and this will rotate the outside turret with its half molds which engage and feed the filled cans from the drum into the closing machine on to the knurled plate. The drum extends to a point beneath the outside turret and the thread extends to a point so as to place the can in the half mold of the outside turret. The thread, of course, is shaped so as to accelerate the can and cause it to move in proper timing to pass into the half mold of the outside turret. When the can reaches the end of the drum, it is well seated in the half mold of the outside turret, and the outside turret will continue the movement of the can without in any way retarding its movement across the stationary plate 78 and on to the knurled plate or can support of the seaming unit which is passing the plate. The half mold of the outside turret cooperates with the half mold of the rounding up turret 11 to round up the can body. In this machine, the can body is not rotated during seaming, and therefore, these half molds may be made so as to fit a can comparatively snugly. It is true, there must be sufficient free movement to allow the can to move into engagement with the chuck. By this comparatively snug fit of the half molds about the cylindrical can body, it is not only properly rounded up for the seating of the end in the can body, but it is also centered on the knurled plate and beneath the chuck so that when the can end is seated in the can body and the can body and end clamped between the knurled plate and the chuck, it will be properly centered relative to the seaming head. If, however, the can body and can end are, for any reason, slightly off center, the floating cam which operates the seaming levers will take care of this slightly off-centered condition, and make a uniform double seam all the way around the can end.

As noted above, the rail 82 guides the filled can all the way into the closing machine until it is properly centered over the knurled plate. By this arrangement, where there is one continuous face along which the can slides until it is placed in the closing machine, the liability of spilling the content of the filled can is reduced to a minimum.

This positioning of the guide rail 82 so that the can moves along the rail from the drum on to the supporting plate in the closing machine, is brought about by the fact that the drum and the outside turret are both positioned on the same side of the guide rail 82. The drum in its rotation forces the can up against the rail and along the rail. Likewise, the outside rotating turret will slide the can along the rail and hold the can up against the rail. Therefore, there is no necessity of transferring the can from one guiding rail to a guiding rail at the opposite side of the can. The curved portion of the guiding rail can be made very short, by reason of the fact that the axis of the drum which determines the straight path of travel of the can lies in a line passing between the center of the axis of rotation of the closing machine and the center of the seaming unit at the time when the can is centered thereon. If the axis of the drum could be placed so that this line intersected the center of the support for the can at the seaming unit, at the time when the can is centered thereon, then there would be no curved travel whatever necessary in the loading of the can on to the support. The present arrangement of the parts very closely approximates the ideal arrangement, which would be, of course, that the can is placed on the support without any curved path of travel.

Figures 12, 13:
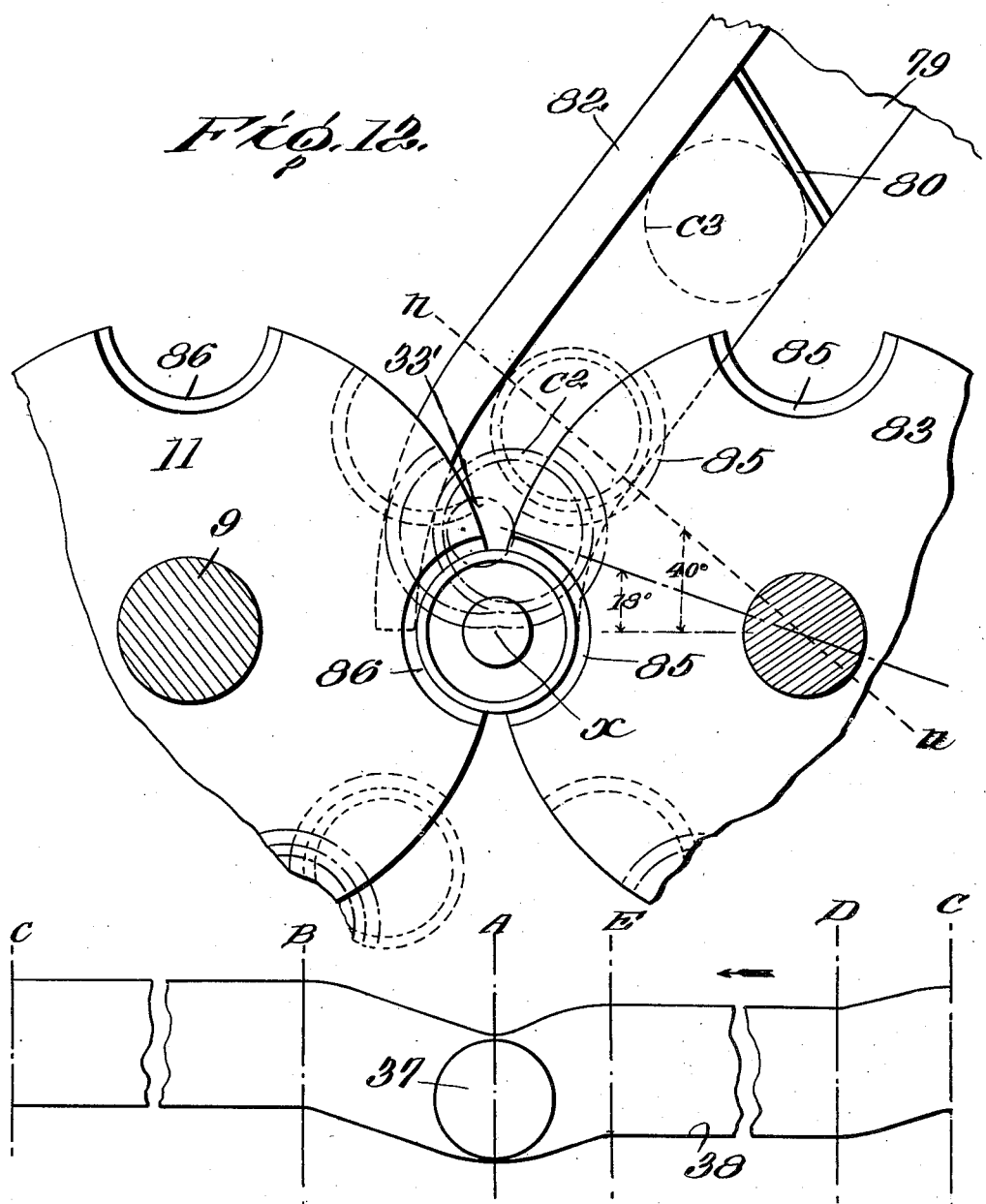
Fig. 12 is a diagrammatic view showing the path of movement of the can into the closing machine, and the time of engagement of the can end by the seating pad.
Fig. 13 is a development of the cam for operating the seating pad.

The center pad associated with the chuck in each seaming unit is made comparatively small in diameter, much smaller than the central depressed portion of the ordinary can end. Therefore, the pad may be lowered into the depressed central portion of the can end before the pad is actually centered relative to the can end. The center pads are moved up and down by the cam groove 38 formed in the sleeve 39. This cam groove is shown in development in Fig. 13. The roll 37 is of less diameter than the width of the cam groove in which it travels. The spindle, together with the pad, the head at the top of the spindle and the roll running in the cam groove, gives some weight to the pad which will cause the pad to move downwardly when there is nothing beneath the pad, until the roll engages the lower wall of the cam groove. When the roll is traveling between the positions B and C in the cam groove, the pad is raised so that it is housed within the chuck and at this time, the seaming of the end to the can takes place. Between the positions C and D, as indicated in Fig. 13, the roll is positively moved downward through engagement with the upper wall of the groove, and then will strip the can from the chuck. This occurs when the support for the can moves down; the can is closed and it is ready to be ejected from the machine. The pad remains at a very slight distance beneath the face of the chuck from the position indicated at D to the position indicated at E. During this path of travel of the turret, the can is fed on to the support which is at the lower position of its movement. Between the position E and A, the pad is allowed to move downward. At this time, the pad is at the position indicated at 33' in Fig. 12. The can and can end have moved sufficiently under the pad as indicated at $C^2$ so that the pad can move down into the central depression in the can end. The pad will then rest on the can end, but will not be forced down by the upper wall of the groove. Therefore, the pad rests more or less lightly on the can end, but with sufficient pressure to hold the can end well seated in the can body. As the turret continues its movement, the can is raised, and the pad moved up therewith, and the can is centered on the support and beneath the chuck, and is finally brought into engagement with the chuck which firmly seats the can end in the can body. The groove between the positions A and B is shaped so as to permit this upward movement of the pad when the can and end are moved into chucking position on the chuck. From B to C, the pad is held housed in the chuck, and the closing of the can takes place. In Fig. 12, a can is shown at $C^3$ which is being moved by the drum, and when the line $n, n$ is reached, the can begins to follow the curved path, the center of which is the center of the outside turret. This is approximately forty degrees from the point where the can is centered in the seaming unit. By reason of this short curved path of travel of the can, and by reason of the center pad engaging and holding the can end on the can during nearly half of its short path of curved travel, very little spilling takes place. When the position E is reached, the roll controlling the center pad is then moved quickly downward, and the closed can stripped from the chuck as stated above.

Referring to Fig. 14 of the drawing, there is shown more or less diagrammatically, the arrangement of the closing machine in connection with a filling machine and the means for operating the drum. It will be noted from this figure that the thread on the drum from the receiving end thereof to the delivery end of the drum is shaped so as to have a continuously increasing pitch, and as has already been noted, this causes acceleration of the can to begin, just as soon as the can is received by the drum, and to gradually increase to the end of the drum where it is delivered. The cans in the filling machine may be more closely spaced than are required in the closing machine, and this acceleration is for the purpose of spacing the cans and delivering them to the closing machine when the acceleration is extended throughout a considerable period of time, then the liquid content in the can will maintain its level in the can. If the can is very quickly accelerated from one speed to another, the level of the liquid is disturbed, and spilling results.

In Fig. 14, the filling machine is indicated at 95. Said filling machine includes a rotating turret 96 and the empty cans indicated at C are delivered by the spirally threaded shaft 97 to this turret 96. The cans as they are moved along the support 98 therefor, by the rotating turret 96 are filled. This rotating turret is provided with spaced arms 99, and the turret is so timed relative to the rotation of the drum that the arm 99 will move the filled can on to the support 81 so that the thread of the drum will take up the movement of the cam. The guide rail 82 extends into the filling machine beneath the rotating turret 96. This end of the guide rail is indicated at $82^a$, and this guide rail is continuous from this point along the drum and into the closing machine and terminates at $82^b$. The rotating turret of the filling machine, therefore, places the filled cans against a guiding rail along which they are moved continuously until these filled cans are centered in the seaming unit of the closing machine. The drum is rotated by a shaft 92. This shaft 92 is connected through a suitable train of mechanism with a gear 100 secured to the lower turret of the closing machine. The axial line of the shaft 92 is indicated by the line $y, y$ in Fig. 14. On the end of the shaft is a sprocket wheel which is connected by a suitable sprocket chain with a sprocket wheel on the end of the drum. The drum shaft is extended beyond the drum and is mounted in a bearing 101 indicated in broken lines in Fig. 14. This driving mechanism for the drum, of course, may be greatly varied, and has only been shown more or less diagrammatically. It is noted, however, that the closing machine operates the drum from the end thereof adjacent the filling machine. This shaft 92 which operates the drum also operates a gear indicated in broken lines at 102 in Fig. 14, and the gear 102 meshes with a gear indicated in broken lines at 103, and thus it is that the shaft 92 also rotates the turret of the filling machine. By this arrangement of the parts, the filling machine turret, the drum and the closing machine are all rotated in proper timing so that the can to be filled after it is delivered to the filling machine, does not lose its timing until it is closed and ejected from the closing machine. Furthermore, after the can is filled, it is moved substantially in a straight line without any curved path of travel along the support from the filling machine to the closing machine, and to a centered position relative to the traveling seaming unit. This handling of the can reduces to a minimum the spilling of the contents thereof.

Associated with this outside turret is a cover feed which may be of any desired character. There is shown in Fig. 14, a stack holder 104 which is provided with a series of cover supporting and releasing devices 105. The release of the cans is controlled by a member 106 located along the drum. This control is of the usual type and description thereof is not thought necessary. When a filled can passes along the guide rail, it will engage the member 106 and this causes the releasing of the end from the stack for the filled can which has engaged this member 106. When the ends are dropped from the stack, they will drop into the half molds of the outside turret and will rest in part on the seat 107 associated with each half mold. It will also rest in part on a ledge 108 formed on the frame surrounding the turret. As the half mold rotates, it will carry the can along this supporting ledge, and it is this half mold into which the filled can is placed by the drum, and when the can is placed in the half mold, then the can end is centered over the same, and the can end and the filled can will be carried forward into the closing machine. The supporting ledge 108 terminates so that the can end drops on to the filled can, and when the seating pad comes into engagement with the can end, it will, through its weight, yieldingly hold the can end seated in the can body until the can body is raised with the raising of the support, and the can end is chucked and fully seated in the can body.

While we have shown the closing machine as directly connected to a filling machine, it will be understood that from certain aspects of the invention, features of the closing machine may be used separate from any filling machine, the filled cans being fed at random and then timed and fed into the closing machine. While we have shown a drum feed for delivering the filled cans to the closing machine, it will be understood, of course, that other types of feeding devices may be used in conjunction with certain features claimed, and again, while we have shown a specific form of seaming unit in conjunction with a drum feed, it will be apparent that from certain aspects of the invention, other types of seaming units may be used. One of the essential features of the present machine is the arrangement of the feeding mechanism for positioning the filled can and can end in the closing machine so that the filled can after it is received by the feeding mechanism will pass along the same guiding rail until it is properly centered relative to the seaming unit which attaches the can end to the can body.

It is obvious that minor changes in the details of construction may be made without departing from the spirit of the invention as set forth in the appended claims.

Having thus described the invention, what we claim as new and desire to secure by Letters Patent is—

1. A closing machine comprising a supporting base, a lower turret rotatably mounted on said base, a plurality of columns mounted on said base and disposed outside of said turret, an upper frame carried by said columns, a center spindle supported by and connected to said lower turret, an upper turret mounted on said spindle and keyed thereto for rotation, said upper turret being journaled in said upper frame, and a series of seaming units and cooperating can supporting units mounted on said turrets.

2. A closing machine comprising a supporting base, a lower turret rotatably mounted on said base, a plurality of columns mounted on said base and disposed outside of said turret, an upper frame carried by said columns, a center spindle supported by and connected to said lower turret, an upper turret mounted on said spindle and keyed thereto for rotation, said upper turret being journaled in said upper frame, a series of seaming units and cooperating can supporting units mounted on said turrets, and actuating mechanism mounted on said upper frame for turning said spindle and turrets and for operating the seaming units.

3. A closing machine comprising a supporting base, a lower turret rotatably mounted on said base, a plurality of columns mounted on said base and disposed outside of said turret, an upper frame carried by said columns, a center spindle supported by and connected to said lower turret, an upper turret mounted on said spindle and keyed thereto for rotation, said upper turret being journaled in said upper frame, a series of seaming units and cooperating can supporting units mounted on said turrets, and a center turret attached to said lower turret and turning therewith and having half molds for rounding up the can body and centering the same relative to the seaming unit.

4. A closing machine comprising a supporting base, a lower turret rotatably mounted on said base, a plurality of columns mounted on said base and disposed outside of said turret, an upper frame carried by said columns, a center spindle supported by and connected to said lower turret, an upper turret mounted on said spindle and keyed thereto for rotation, said upper turret being journaled in said upper frame, a series of seaming units and cooperating can supporting units mounted on said turrets, each of said seaming units including a rotatable head, seaming levers mounted on said rotatable head, a gear associated with each head, a sleeve surrounding the spindle, a gear carried thereby and meshing with the gears associated with the seaming heads, means for rotating the turrets, and means for rotating the sleeve for imparting rotation to the seaming heads.

5. A closing machine comprising a supporting base, a lower turret rotatably mounted on said base, a plurality of columns mounted on said base and disposed outside of said turret, an upper frame carried by said columns, a center spindle supported by and connected to said lower turret, an upper turret mounted on said spindle and keyed thereto for rotation, said upper turret being journaled in said upper frame, a series of seaming units and cooperating can supporting units mounted on said turrets, each of said seaming units including a rotatable head, seaming levers mounted on said rotatable head, a gear associated with each head, a sleeve surrounding the spindle, a gear carried thereby and meshing with the gears associated with the seaming heads, means for rotating the turrets, and means for rotating the sleeve for imparting rotation to the seaming heads, said means for rotating the turrets and sleeve being supported in a housing carried by said upper frame, said housing having a removable coverplate whereby access may be readily had to the operating means within the housing.

6. A closing machine comprising a supporting base, a lower turret rotatably mounted on said base, a plurality of columns mounted on said base and disposed outside of said turret, an upper frame carried by said columns, a center spindle supported by and connected to said lower turret, an upper turret mounted on said spindle and keyed thereto for rotation, said upper turret being journaled in said upper frame, a series of seaming units and cooperating can supporting units mounted on said turrets, each of said seaming units including a rotatable sleeve, a seaming head attached thereto, seaming levers mounted on said head, an actuating cam within said head for said seaming levers, a floating sleeve carrying said cam, means for rotating the seaming heads, and a stationary cam for moving the floating sleeves carrying the actuating cams as the turret rotates.

7. In a closing machine, a rotatable turret, a series of seaming units carried thereby, each unit having a rotatable head carrying a series of seaming rolls, the rolls on adjacent heads being staggered in their time of rotation and having their paths of travel intersecting, whereby the rotatable heads may be placed relatively close together and close to the center of rotation of the turret.

8. In a closing machine, a rotatable turret, a series of seaming units carried thereby, each unit having a rotatable head, pairs of first and second operation seaming levers mounted on each head, a roll carried by each lever, said levers being mounted so as to swing about horizontal axes, the seaming rolls in adjacent heads being staggered in their time of rotation and having their paths of travel intersecting whereby the rotatable heads may be placed relatively close together and close to the center of rotation of the turret.

9. In a closing machine, a rotatable turret, a series of seaming units carried thereby, each unit including a pair of opposed seaming levers, a seaming roll on each lever, said rolls operating at diametrically opposite points on the can end seam, and a cam for moving said levers, said cam being supported so as to move freely laterally, limited in its movement by contact of the seaming rolls with the seam.

10. In a closing machine, a rotatable turret, a series of rotating seaming units carried thereby, each unit including a pair of opposed seaming levers, a seaming roll on each lever, said rolls operating at diametrically opposite points on the can end seam, and a cam for moving said levers, said cam being supported so as to move freely laterally, limited in its movements by contact of the seaming rolls with the seam, said support for said cam being mounted so that the cam rotates with the seaming levers as the seaming unit rotates.

11. In a closing machine, a rotatable turret, a series of rotating seaming units carried thereby, each unit including a pair of opposed seaming levers, a seaming roll on each lever, said rolls operating at diametrically opposite points on the can end seam, a cam for moving said levers, said cam being supported so as to move laterally, limited in its movements by contact of the seaming rolls with the seam, said support for said cam being mounted so that the cam rotates with the seaming levers as the seaming unit rotates, and a stationary cam cooperating with each support for the cams for actuating the seaming levers for reciprocating the supporting means for operating the seaming levers in proper timing.

12. In a closing machine, a rotatable seaming head, pairs of first and second operation seaming levers mounted thereon for oscillation about horizontal axes, a seaming roll carried by each lever, a cam for moving said levers, a sleeve supported centrally of the seaming unit for actuating said cam, said sleeve being supported at its upper end and free to move laterally, limited in its movement by engagement of the seaming rolls with the can end seam.

13. In a can closing machine, a seaming unit including a rotatable head, a sleeve supporting said head, a chuck mounted within said head, means for holding the chuck from rotation, opposed seaming levers carried by said rotating head, seaming rolls carried by said levers, a cam for actuating said seaming levers, means disposed centrally of the sleeve supporting the rotating head for carrying and actuating said cam, said cam being free to move laterally, limited in its movements by the contact of the seaming rolls with the seam.

In testimony whereof, we affix our signatures.

JOHN COYLE.
JOHN C. TALIAFERRO, Jr.
OTTO A. SCHMITT.